July 4, 1961         E. SCHNITZER         2,991,067
BAND PASS SHOCK ABSORBER
Original Filed Sept. 30, 1957
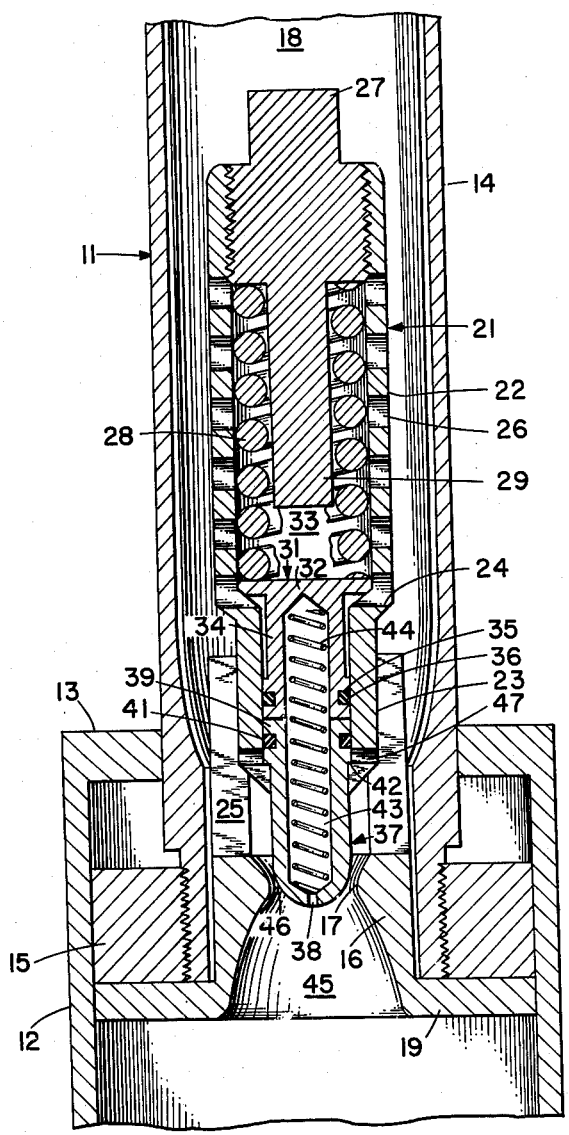
INVENTOR
EMANUEL SCHNITZER
BY
ATTORNEYS

United States Patent Office 2,991,067
Patented July 4, 1961

2,991,067
BAND PASS SHOCK ABSORBER
Emanuel Schnitzer, 926 19th St., Newport News, Va.
Original application Sept. 30, 1957, Ser. No. 687,310, now Patent No. 2,928,670, dated Mar. 15, 1960. Divided and this application Mar. 7, 1960, Ser. No. 13,400
1 Claim. (Cl. 267—64)
(Granted under Title 35, U.S. Code (1952), sec. 266)

The invention described herein may be manufactured and used by or for the Government of the United States of America for governmental purposes without the payment of any royalties thereon or therefor.

This application is a division of my copending application Serial No. 687,310, filed September 30, 1957, issued March 15, 1960 as Patent No. 2,928,670, which in turn is a continuation-in-part of my copending application Serial No. 528,563, filed August 15, 1955, now Patent No. 2,866,633.

This invention relates to shock struts for machine elements and the like with particular application to shock absorbers including a piston slidable in a fluid containing cylinder. In conventional shock absorbers of this type, when the piston moves under compression in the cylinder the fluid is forced through a small orifice in the piston, giving rise to a damping action which is roughly proportional to the square of the relative velocity of piston and cylinder. It is apparent, therefore, that the higher the disturbance frequency or time rate of change of loading, the more resistance the absorber exhibits to relative motion until at high frequencies it is, in effect, a rigid link.

One of the primary objects of the invention is to filter out, in a shock absorber, loads from disturbances in certain frequency ranges or having certain rates of application while retaining the required load arresting characteristics of conventional shock absorbers in the remainder of the frequency spectrum.

Another object is to provide simplified and improved means for placing the primary object of the invention into effect.

Another object of the invention is to provide means for utilizing the metering pin of the piston in a conventional piston-cylinder type shock absorber, both as a control by telescoping displacement and as a load filtering device by virtue of its hollow construction permitting fluid flow therethrough.

Still another object is to provide a shock absorber sensitive not only to displacement of the coacting parts but to the frequency of the relative movement of the parts.

A further object is to provide an arrangement in shock absorbers in which parts may be removed, replaced or adjusted without the necessity of complete disassembly of the shock absorber strut.

Other objects and many of the attendant advantages of this invention will be readily appreciated as the same becomes better understood by reference to the following detailed description when considered in connection with the solitary figure of the accompanying drawing wherein is shown a fragmentary longitudinal sectional view of the shock absorber with the metering pin fixed to and mounted within the shock absorber piston.

Referring now to the drawing, a shock absorber 11 adapted for insertion between two relatively movable machine parts, not shown, such as an airplane body and a supporting wheel, and which utilizes the hollow type pin for fluid flow, is shown. The hollow shock absorber lower cylinder 12, which is filled with a fluid, not shown, such as oil, at its open upper end is provided with an inner flange 13 with a coaxial cylindrical surface on its inner side for sliding engagement with the outer wall of the hollow shock absorber upper piston cylinder 14, which is partially filled with fluid overflow from cylinder 12 and partially filled with a gas, such as air. In turn, the lower open end of piston 14 is provided with a terminal external flange 15, screwthreaded to the piston, the outer flange surface being cylindrical and forming a sliding contact with the inner wall of hollow cylinder 12. These two flanges 13 and 15 form terminal walls for a variable sized chamber which serves as a load rate sensitive buffing means as described in my copending application Serial No. 686,800, filed September 27, 1957, now Patent No. 2,947,386, issued August 2, 1960. The piston and receiving cylinders 14 and 12 are slidingly interengaged by interlocking flanges 15 and 13, as shown. A short base tube 16, with an upper constriction defining a main orifice 17 is placed at the lower end of the upper cylinder chamber 18, a radial flange 19 at its lower edge underlying and being interconnected with flange 15, thereby fastening the tube 16 to the upper cylinder 14.

A control unit 21 is axially positioned wholly within the upper cylinder 14 and includes a main tubular section 22 of larger diameter and a lesser tubular section 23 of reduced diameter disposed therebelow; the sections 22 and 23 being joined end to end by the joint 24. A spider 25 is spaced around and attached at its upper end to the lower tubular section 23 of unit 21, and at its lower end to the upper end of base tube 16 around the main orifice 17, to maintain control unit 21 in position in upper cylinder 14. Main section 22 is perforated with a plurality of openings 26 for fluid flow therethrough, and at its upper end is internally threaded to receive a plug 27, forming a stop for one end of coil spring 28 extending lengthwise inside the main section. A stop 29 depends from plug 27 to limit the movement of piston 31. This piston is positioned at the lower end of control section 22 and includes the piston head 32 extending transversely across the chamber 33 within main control section 22 and a tubular skirt 34 provided with a lower end groove 35 in which a circular ring seal 36 is normally positioned for sliding contact with the inner surface of control section 23. The offset in joint 24 between the main and lesser control sections 22 and 23 serves as a stop for holding piston 31 at its normal down limit.

Plunger 37 is also mounted for sliding movement in smaller section 23, this plunger being in the form of an inverted and elongated thimble, with a small bleed orifice 38 centrally placed in its lower closed end and with an annular grooved flange 39 containing a circular ring seal 41 around its upper free end. This upper end is adjacent the lower sealed end of piston 31 and moves in the same smaller section enclosure. The lower limit of movement of the plunger 37 is fixed by an annular shoulder 42 at the lower end of section 23, engaging the lower protruding face of the groove flange 39.

Since both piston skirt 34 and plunger 37 are hollow and possess open adjoining ends, a chamber 43 is formed by these elements, this chamber being of variable length, depending on the relative movement of piston and plunger. A weak coiled spring 44 inside both plunger and piston tends to force these elements apart but such action is normally prevented by the greater downward force of stronger spring 28, the latter being held at its upper end by plug 27 and pressing piston 31 against the joint stop 24.

In use, under the influence of a slowly applied force tending to telescope the upper and lower strut cylinders together, the fluid pressure in lower cylinder space 45 rises slowly, forcing fluid through the annular passage 46 in main orifice 17 and, also, through the bleed orifice 38 into region 43 between plunger 37 and piston 31. Since the pressure rise is gradual, orifice 38 does not present an important resistance to the flow of fluid into space 43. Consequently, the pressure in region 43 builds up at approximately the same rate as that in region 45 with the result that piston 31 is forced upward compressing spring 28 to such a value that the spring forces acting downwardly on the piston head balances the combined force exerted by the fluid pressure in region 43 and the weak spring 44. Since the cross sectional area of the top of plunger 37 is greater than the cross sectional area of the bottom of this plunger, a net downward force is exerted which tends to maintain plunger 37 in its bottom or equilibrium position.

Under the influence of a rapidly applied load, the pressure in region 45 rises rapidly and orifice 38 presents a considerable resistance to the flow of fluid into region 43, with the result that spring 28 is not compressed sufficiently to balance the upper force on plunger 37 when this plunger is in the down position. Consequently, plunger 37 rises, opening widely the main orifice passage 46 and allowing rapid transfer of fluid from region 45 of the lower main cylinder to region 18 of the upper main cylinder. Thus, the shock strut elements are allowed to telescope rapidly with the result that only a small load is developed in the strut.

It is to be noted that holes 47 are provided radially in the smaller control section 23 just above the top shoulder 42 to prevent trapping of fluid below flange 39 on plunger 37 when the plunger is forced upwardly to form an annular space below flange 39. It is to be noted, further, that the structure disclosed permits only a slow telescoping during rebound. It is to be understood that in the structural form herein disclosed, the plunger or pin movable in the main orifice of the upper or piston cylinder serves the dual function of varying fluid flow through the orifice by varying the size of the annular flow area and also by passing fluid, under certain conditions of load application, through the pin itself.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

A shock absorber for connection between two machine parts, comprising a hollow cylinder partially filled with fluid forming a piston connectable to one part, a hollow fluid filled cylinder forming a receiver connectable to the other part, said piston having telescoping connection with said receiver, a piston head having a main orifice therein at the compression end of said piston, a hollow plunger forming a fluid passage way and having a closed end with a bleed orifice therein positioned in said main orifice, a tubular section mounted on one of said cylinders, said plunger having sliding connection within one end of said tubular section in continuation thereof, a piston slidingly movable in said tubular section in juxtaposition to said plunger, a stop connected to the other end of said tubular section, a compression spring disposed in said tubular section to exert pressure against said stop plug and tubular section piston, means for limiting the sliding movement of said tubular section piston under pressure exerted thereagainst by said compression spring, and means for limiting the sliding movement of said plunger under pressure exerted thereagainst by said juxtaposed tubular section piston, said tubular section between said stop plug and piston having wall perforations and said plunger having a transverse area in juxtaposition with said tubular section piston greater than the closed end of said plunger.

References Cited in the file of this patent
UNITED STATES PATENTS
2,570,362     Mercier _____ Oct. 9, 1951

UNITED STATES PATENT OFFICE
CERTIFICATE OF CORRECTION

Patent No. 2,991,067                                                      July 4, 1961

Emanuel Schnitzer

It is hereby certified that error appears in the above numbered patent requiring correction and that the said Letters Patent should read as corrected below.

Column 3, line 24, for "top" read -- stop --; column 4, line 19, after "stop" insert -- plug --.

Signed and sealed this 12th day of December 1961.

(SEAL)
Attest:

ERNEST W. SWIDER                                            DAVID L. LADD
Attesting Officer                                           Commissioner of Patents

USCOMM-DC